United States Patent [19]
Armstrong

[11] Patent Number: 5,535,520
[45] Date of Patent: Jul. 16, 1996

[54] CORNER SAW

[76] Inventor: Kenneth L. Armstrong, 1280 Hwy. 179, Covington, Tenn. 38019

[21] Appl. No.: 391,654

[22] Filed: Feb. 21, 1995

[51] Int. Cl.$^6$ .................................................. B27B 19/09
[52] U.S. Cl. ................ 30/375; 30/392; 30/339; 83/699.21
[58] Field of Search ............................ 30/374, 375, 376, 30/377, 392, 373, 337, 338, 339; 83/699.21

[56] References Cited

U.S. PATENT DOCUMENTS

| D. 332,902 | 2/1993 | Dobson | D8/64 |
|---|---|---|---|
| T.941,019 | 12/1975 | Kranzler et al. | 30/376 |
| 3,146,809 | 9/1964 | Botefuhr | 30/376 |
| 3,360,021 | 12/1967 | Mejia | 30/392 X |
| 3,412,767 | 11/1968 | Green, Jr. | 30/392 |
| 3,481,374 | 12/1969 | Schindler | 30/373 |
| 3,547,166 | 12/1970 | Dudek | 30/392 X |
| 4,094,349 | 6/1978 | Lajack et al. | 30/504 |
| 4,448,432 | 5/1984 | French | 279/83 |
| 4,566,190 | 1/1986 | Isakson | 30/373 |
| 4,601,477 | 7/1986 | Barrett et al. | 279/30 |

FOREIGN PATENT DOCUMENTS 2248908  5/1975  France .................................. 30/375

Primary Examiner—Rinaldi I. Rada
Assistant Examiner—Raymond D. Woods
Attorney, Agent, or Firm—Rhodes & Ascolillo; David L. Baker

[57] ABSTRACT

The combination of an extension to the shaft of a sabre saw that moves the blade forward of the gear box housing and a guide plate with plates on the end that will abut a transverse plane and channels that will allow the saw to slide forward on the guide plate against a spring bias to cut to the intersection of two planes.

4 Claims, 3 Drawing Sheets 5,535,520

CORNER SAW

BACKGROUND OF THE INVENTION

1. Field of the Invention

This invention relates generally to hand tools and more particularly to hand power tools such as the electric sabre saw.

2. Description of the Prior Art

The electric sabre saw was a substantial improvement over the prior art hand saw or circular saw. The blade is narrow enough that it will cut curves and circles and is portable enough to work almost anywhere electrical power is available. The conventional sabre saw consists of a horizontal electric motor with a handle arrangement on the top, a guide plate affixed to the bottom and a reciprocating vertical shaft on one end. The tool has remained virtually unchanged over the years except for some attempts to improve the means for connecting the saw blade to the reciprocating shaft.

A typical sabre saw is shown in U.S. Design Pat. No. Dds. 332,902 issued Feb. 2, 1993 to Dobson. U.S. Pat. No. 4,094,349 issued Jun. 13, 1978 to Lajack for a hand operated sabre saw. Improvements to the connecting means for the saw blade were recognized in U.S. patents granted to French for a sabre saw chuck, number 4,448,432 issued May 15, 1984, and Barrett et al. for a sabre saw blade clamp, number 4,601,477 issued Jul.22,1986.

The chief shortcoming of the typical sabre saw is its inability to cut to the corner or intersection of two pieces that are in planes the intersect at substantially 90 degrees. The reason for this is shown clearly in FIGS. 4,5 and 7 in the Dobson patent. The saw blade is, as a matter of mechanical necessity, located behind the leading edge of the housing containing the gearing necessary to cause the shaft to reciprocate. In the Dobson patent the guide plate is shorter than most conventional tools but the ordinary guide plate extends beyond the housing. It can be seen then, that if the occasion arose to cut a base board trim piece it would be impossible since the housing would strike the wall before the saw blade could reach the base board. This has long been a source of consternation to carpenters and workers in the field.

The disclosure herein provides a means for connecting the saw blade and a complementary guide plate that will allow a sabre saw cut right to the corner in a heat, orderly and safe manner.

The prior art cited and otherwise known to exist fails to anticipate the new and novel device disclosed and claimed by Applicant.

SUMMARY OF THE INVENTION

The invention is directed to a device for modifying a conventional sabre saw in a manner that will allow it cut to the corner of the intersection of two intersecting planes. The substitution of a forward reaching clamp and a sliding guide will allow the blade of the saw to reach the full thickness of the piece to be cut without damaging the piece in the transverse plane. The saw housing is mounted on a designed bracket that slides in a pair of parallel channels on the saw guide plate. The end of the guide plate is equipped with a pair of butt plates that press against the transverse plane. The saw blade will not extend beyond the surface of the butt plates. The guide is biased against the transverse plane by a spring connected between the housing and the guide plate, whereby as the housing slides along the channels the pressure is increased causing two reactions, one pressing the butt plates against the transverse panel and two, giving the operator greater control over the depth of cut as moves the saw against the increasing force of the spring.

It is therefore an object of the invention to provide a new and improved corner saw adapter.

It is another object of the invention to provide a new and improved corner saw adapter that will allow complete cuts through pieces mounted in transverse planes.

It is a further object of the invention to provide a new and improved corner saw adapter that gives the a sabre saw greater cutting range than other similar saws.

It is still another object of the invention to provide a new and improved corner saw adapter that gives the operator of a sabre saw greater control over the depth of cut than any similar type saw.

It is still a further object of the invention to provide a new and improved corner saw adapter which is of a durable and reliable construction.

It is another object of the invention to provide a new and improved corner saw adapter which is low in cost and easily manufactured and marketed.

These, together with other objects of the invention, along with the various features of novelty which characterize the invention, are pointed out with particularity in the claims annexed to and forming a part of this disclosure. For a getter understanding of the invention, its operating advantages and the specific objects attained by its uses, references should be had to the accompanying drawings and descriptive matter in which there is illustrated preferred embodiments of the invention.

BRIEF DESCRIPTION OF THE DRAWINGS

The invention will be getter understood and objects other that those set forth above will become apparent when consideration is given to the following detailed description thereof. Such description makes reference to the annexed drawings wherein.

DETAILED DESCRIPTION OF A PREFERRED EMBODIMENT

Figure 1:
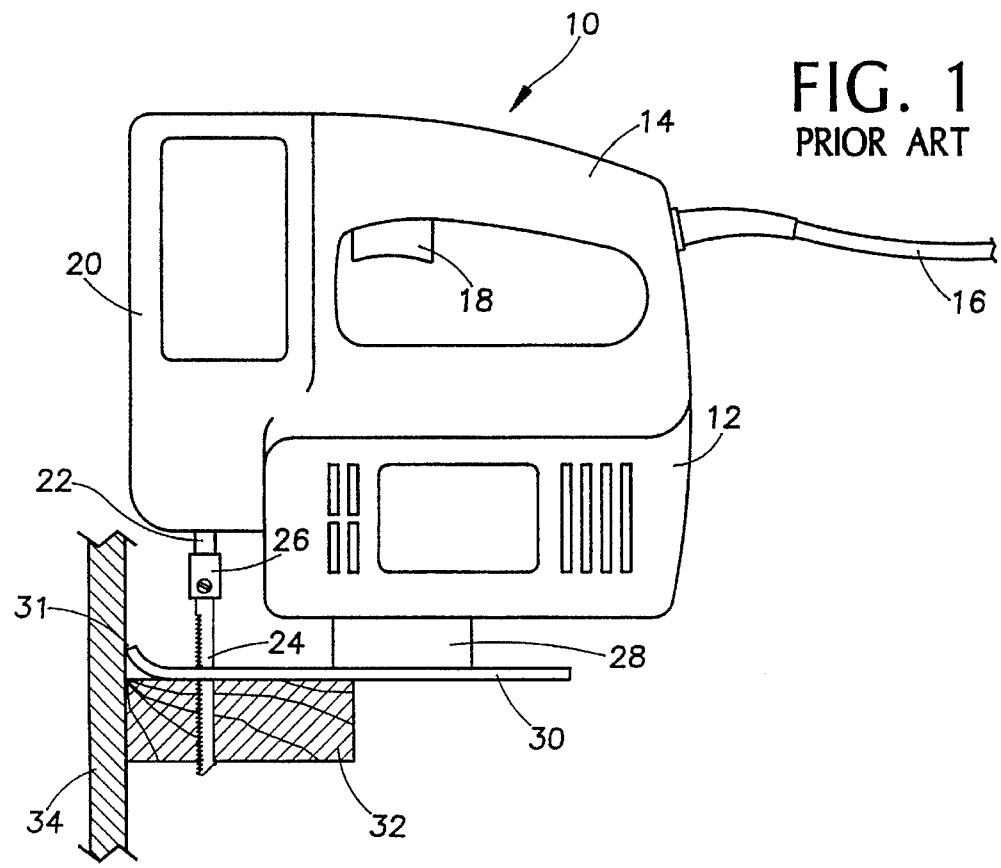
FIG. 1 is a left side elevation view of a typical prior art sabre saw.

Referring now to FIG. 1, the prior art sabre saw is shown generally as 10, and consists of an electric motor contained in a housing at 12, and a handle 14 for grasping the saw and maneuvering it while operating. An electrical lead 16 brings power to the motor which is controlled by the "ON-OFF" switch 18. A gear box assembly 20 is positioned in front of the motor and has the function of changing the rotary motion of the motor to linear motion for the shaft 22 to drive the saw blade 24 which is connected thereto by means of the collar 26. The housing is connected by attachment means 28 to the guide plate 30. On prior art saws the connection between the guide plate and the housing is longitudinally rigid although some saws allow for rotational movement to permit angular cuts.

As shown, the conventional sabre saw will not allow the blade 24 to cut completely through the beam 32 as the gear box 20 and in this case the leading edge of the guide 31 strike the transverse plane 34 which may be, for example, a wall.

Figure 2:
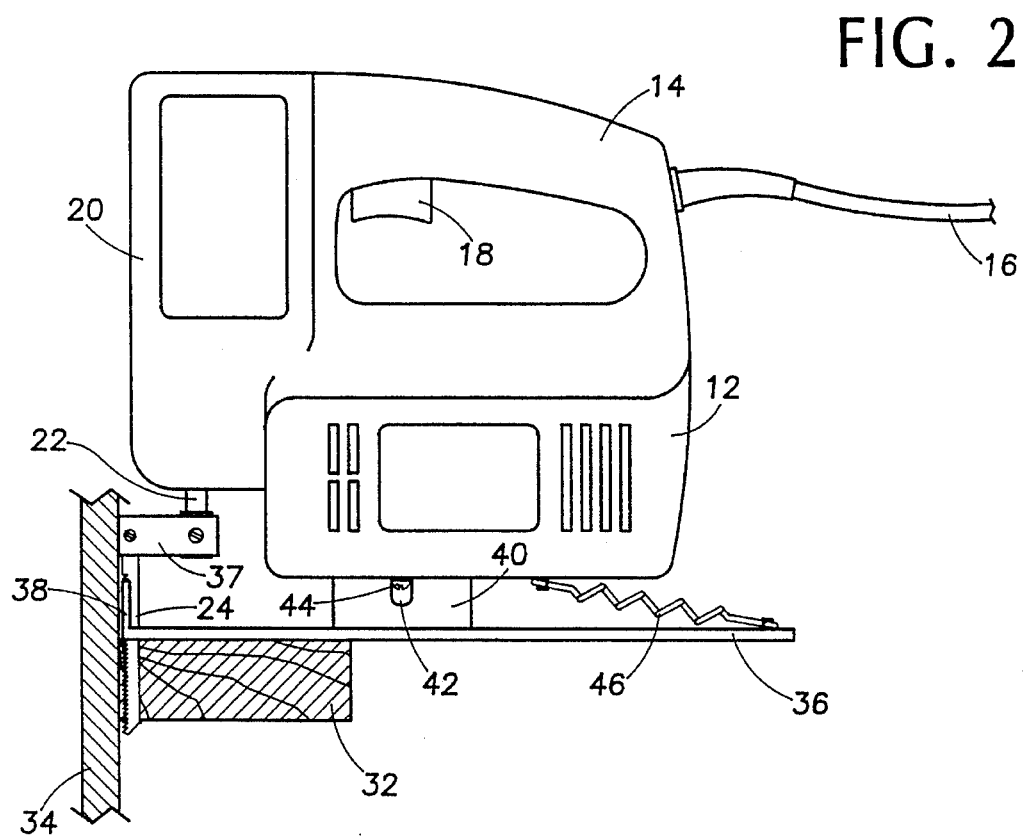
FIG. 2 is a left side elevation view of a sabre saw with the invention modification.
Figure 3:
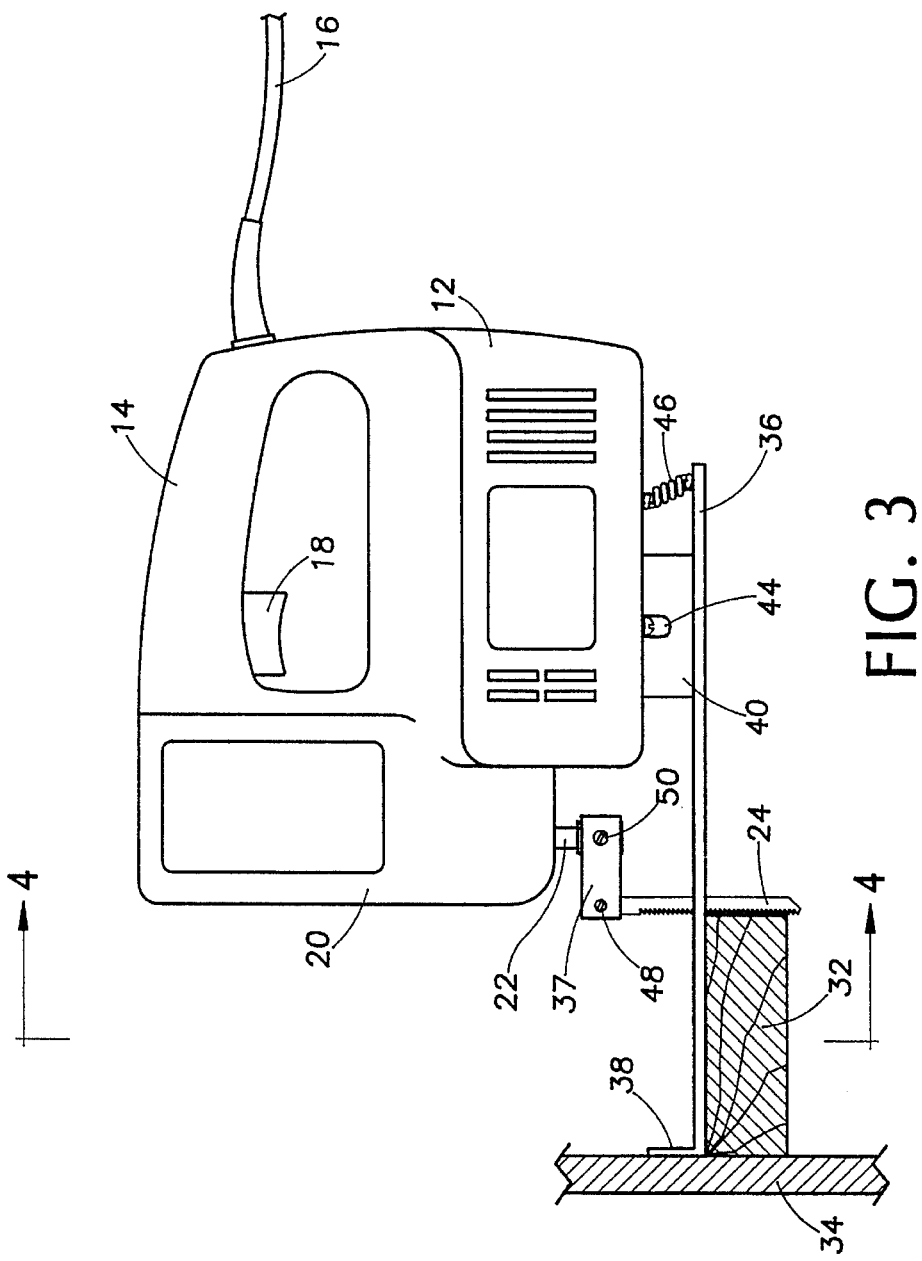
FIG. 3 is another left side elevation view of a saber saw with the invention modification.

The adapter of the invention is installed on the conventional saw as shown in FIGS. 2 and 3. FIG. 2 shows the saw in the same relative position as the conventional saw of FIG. 1. The extension 37 is connected to the reciprocating shaft 22 and moves the saw blade 24 forward of the gear box housing 20. Guide 36 includes butt ends 38 which engage the plane 34. The motor housing 12 is connected to the guide plate 36 by means of the connecting bow shaped member 40 which may include a slot 42 to accept the securing screw 44. The slot allows the saw to be adjusted for angle cuts in a known manner. A spring 46 is connected to the end of guide plate 36 and the approximate mid-point of the motor housing, thereby providing increasing resistance to the saw as it approaches the plane 34, thus increasing the control of the blade by the operator. FIG. 3 shows the posture of the sabre saw in position prior to commencing a cut. In particular, the guide 36 abuts the plane 34 with plates 38 and rests on the beam 32 giving additional support to the saw, not found in conventional sabre saws. The saw blade 24 is connected to the extension 37 by threaded screws 48,50 which engage the saw blade and the reciprocating shaft 22. The connecting member 40 slides in a pair of channels allowing the saw to move toward the butt ends 38 until it reaches its limit of travel as shown with regard to FIG. 2. Release of the handle 14 during operation will cause the saw to retract away from the plane 34 due to the bias of spring 46.

Figure 4:
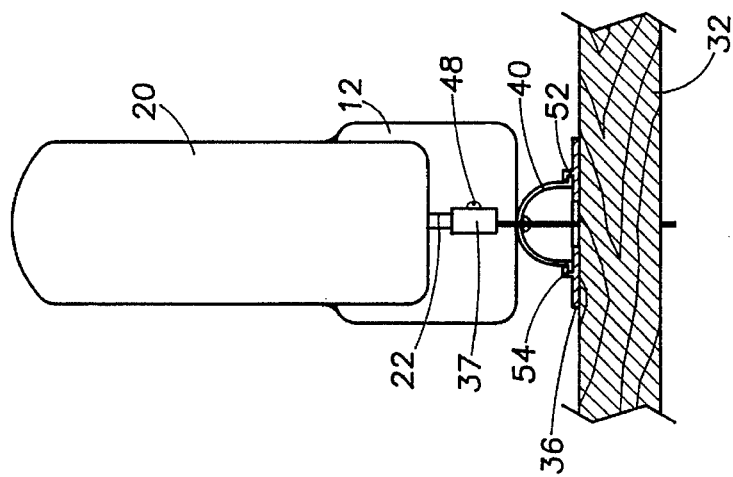
FIG. 4 is an front elevation view of the invention looking along lines 4—4 of FIG. 3.

FIG. 4 more clearly illustrates the bow shaped connector member 40 which includes flanged rails that slide in cooperating channels 52,54 in the guide plate 36.

Figure 5:
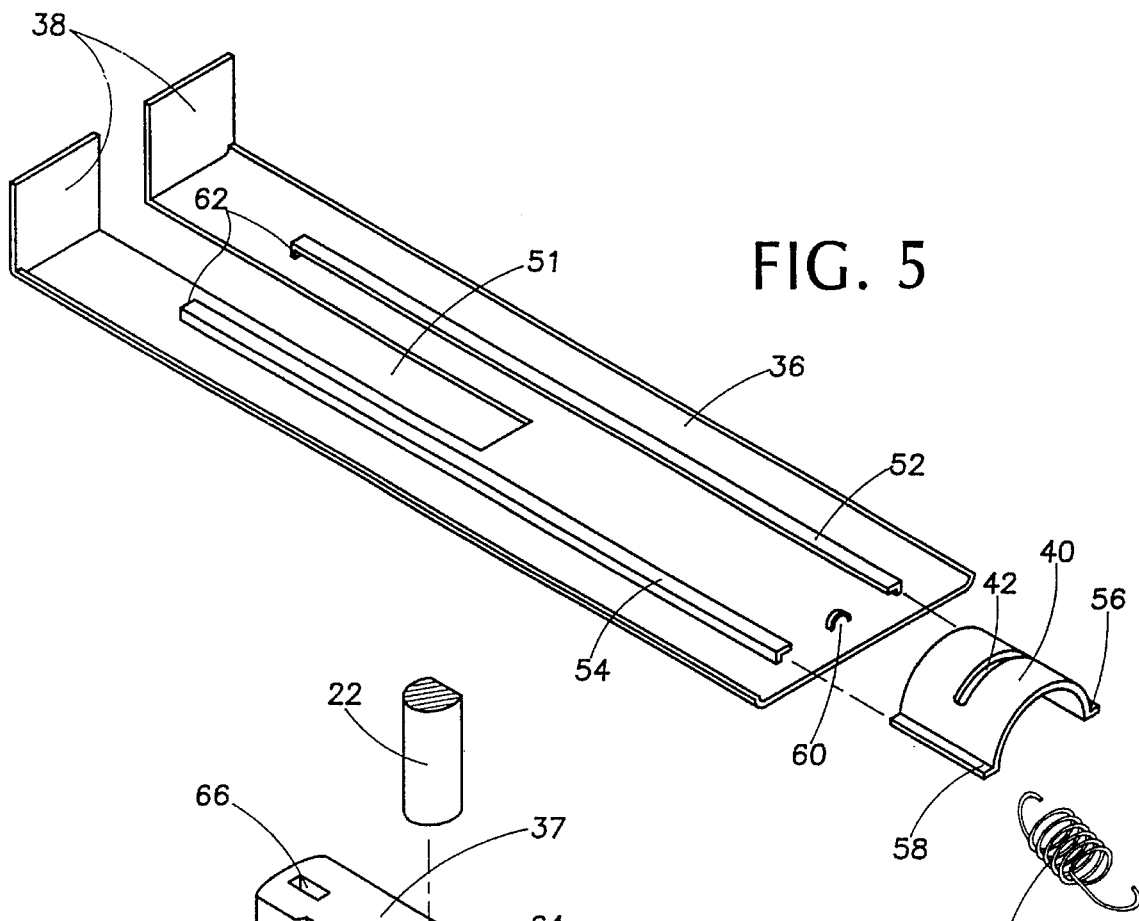
FIG. 5 is a perspective view of the guide plate of the invention.

The guide plate is more clearly shown in FIG. 5 and includes butt ends 38 which abut the transverse panel a slot 51 that allows the saw blade to pass through channels 52 and 54. Channels 52, 54 accept the flange rails 56,58 of the connecting member 40. In addition, the guide plate 36 provides a connecting means 60 for attachment of the spring 46. In operation, the flanges 56,58 slide in the channels 52,54 to a preset limit at the end 62 of the channels. Disconnecting the spring will allow the saw and connecting member 40 to be removed from the guide once the saw blade is removed.

Figure 6:
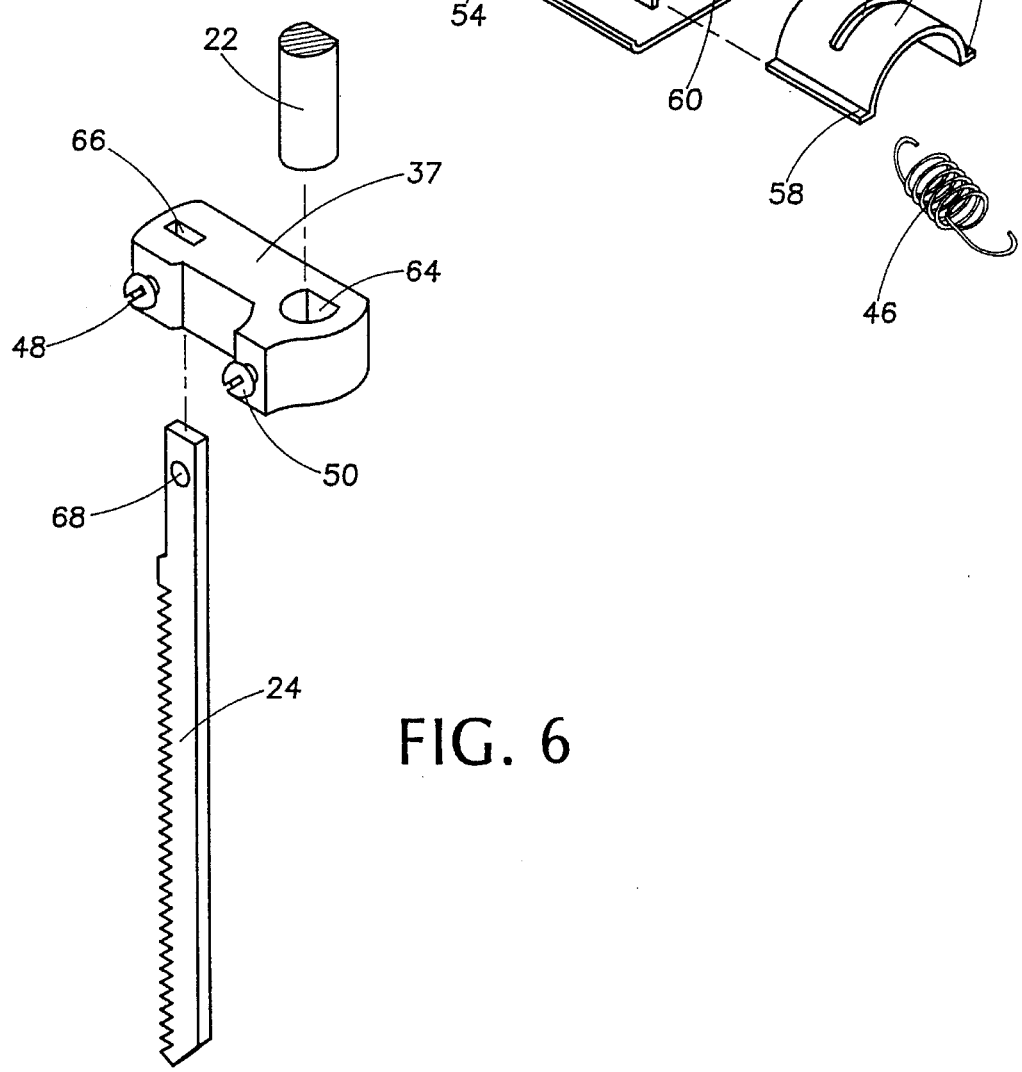
FIG. 6 is a perspective view of the extension collar of the invention.

Concerning FIG. 6, the extension 37 of the invention includes throughgoing apertures 64,66 shaped to receive the saw blade 24 and the shaft 22. In the case described the shaft has a fiat side which is common in the sabre saw art. If the shaft was otherwise shaped the aperture could be so shaped within the intent of the invention. Machine screws 48 and 50 may be threaded through the extension and form a set condition against the blade and shaft or the screw may pass through an aperture 68 in the blade 24 and engage a threaded aperture on the distal side of the aperture which is another common manner of fastening saw blades.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. An improved saber saw having a housing, an electric motor in the housing, a means for supplying power to the motor and a switch for controlling the power, a handle forming a part of the housing for carrying and operating the saw, a gear box in the housing, connected to the motor at one end, for changing rotating motion to linear motion, and a reciprocal shaft connected to the gear box, the improvement comprising:

a guide plate including:
    a pair of parallel channels; and
    a connector means including:
        a pair of flange rails for engaging said channels and allowing said connector means to slide a length of the channels;
        means adapted to connect said housing to the connector means;
        butt plates mounted at one end of the guide plate to abut a surface and stabilize said guide plate in one direction;
        extension means adapted to connect a saw blade to said shaft and so mounted to cause said blade to extend toward said butt plates;
        a spring means, having one end attached to the guide plate at an end of the guide plate opposed to the butt plates and said spring means having another end connected to said housing for biasing the saw blade away from the butt plates;
        an elongated slot extending from and between said butt plates along a longitudinal axis of the guide plate to a terminus at a mid-point of said axis; and
        means in ends of said channels, proximate the butt plates, to terminate longitudinal movement of the connector means in a direction of the butt plates.

2. An improved saber saw having a housing, an electric motor in the housing, a means for supplying power to the motor and a switch for controlling the power, a handle forming a part of the housing for carrying and operating the saw, a gear box in the housing, connected to the motor at one end, for changing rotating motion to linear motion, and a reciprocal shaft connected to the gear box, the improvement comprising:

a guide plate including:
    a pair of parallel channels; and a connector means including:
        a pair of flange rails for engaging said channels and allowing said connector means to slide a length of the channels;
        means adapted to connect said housing to the connector means;
        butt plates mounted at one end of the guide plate to abut a surface and stabilize said guide plate in one direction;
        extension means adapted to connect a saw blade to said shaft and so mounted to cause said blade to extend toward said butt plates;
        a spring means, having one end attached to the guide plate at an end of the guide plate opposed to the butt plates and said spring means having another end connected to said housing for biasing the saw blade away from the butt plates;
        an elongated slot extending from and between said butt plates along a longitudinal axis of the guide plate to a terminus at a mid-point of said axis; and
        means in ends of said channels, proximate the butt plates, to terminate longitudinal movement of the connector means in a direction of the butt plates; and a block having spaced apart first and second throughgoing apertures where one of said apertures is adapted to receive the saw blade and another of said apertures is adapted to receive the reciprocal shaft from said gear box of the sabre saw, and means for securing the saw blade to the block and means for securing the block to the shaft.

3. The improvement according to claim 2 wherein the means for securing the saw blade to the block is a machine screw.

4. The improvement according to claim 2 wherein the means for securing the block to the shaft is a machine screw.

* * * * *